United States Patent
Reddy et al.

(10) Patent No.: US 9,898,107 B1
(45) Date of Patent: Feb. 20, 2018

(54) TACTILE INPUT CONTOL DATA MODIFYING SYSTEM, DEVICE, AND METHOD

(71) Applicant: Rockwell Collins, Inc., Cedar Rapids, IA (US)

(72) Inventors: Bandi Bharat Kumar Reddy, Marion, IA (US); Norm W. Arons, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 56 days.

(21) Appl. No.: 15/087,707

(22) Filed: Mar. 31, 2016

(51) Int. Cl.
G06F 3/038 (2013.01)
G06F 3/0354 (2013.01)
G06N 7/02 (2006.01)

(52) U.S. Cl.
CPC .......... G06F 3/038 (2013.01); G06F 3/03549 (2013.01); G06N 7/02 (2013.01)

(58) Field of Classification Search
CPC ..... G06F 3/038; G06F 3/03549; G06N 5/022; G06N 5/02; G06N 5/048; G06N 5/025; G06N 7/02; G06N 7/023; G06N 7/026; G05B 13/00; G05B 13/0275; G05B 13/041; G01C 23/00; G01C 23/005; B64C 19/00
See application file for complete search history.

(56) References Cited

U.S. PATENT DOCUMENTS

| | | | | | |
|---|---|---|---|---|---|
| 5,946,221 A | * | 8/1999 | Fish, Jr. | ................ | B08B 15/023 454/239 |
| 6,047,275 A | * | 4/2000 | Jaremko | ............ | G05B 13/0275 706/1 |
| 6,104,969 A | * | 8/2000 | Beeks | .................... | G01C 23/00 345/157 |
| 8,311,973 B1 | * | 11/2012 | Zadeh | ..................... | G06N 7/02 706/62 |
| 2011/0050563 A1 | * | 3/2011 | Skutt | ...................... | G06F 3/033 345/156 |
| 2016/0062470 A1 | * | 3/2016 | Pandey | .................. | G06F 3/017 345/156 |

OTHER PUBLICATIONS

Federal Aviation Administration; Aeronautical Information Manual; Dec. 10, 2015; p. 7-1-47.

* cited by examiner

*Primary Examiner* — Jonathan Boyd
*Assistant Examiner* — Sardis F Azongha
(74) *Attorney, Agent, or Firm* — Daniel M. Barbieri; Donna P. Suchy; Angel N. Gerdzhikov

(57) ABSTRACT

A tactile control device and method for generating a modifier through the use of fuzzy logic for modifying control data responsive to a user's tactile input with the device are disclosed. The system may include one or more measurements corresponding to one or more interfering factors, a source of control data representative of a command generated in response to the user's tactile interaction, and a processing unit (PU). The PU may be configured to receive input data representative of at least one measurement corresponding to a measurement(s) of an interfering factor, determine a plurality of values based upon the measurement(s) and a plurality of first functions, determine a control data modifier based upon the plurality of values, and generate data representative of the modifier, where the modifier may be applied to the control data or data correspond to the control data.

20 Claims, 10 Drawing Sheets

| Intensity | Aircraft Reaction | Reaction Inside Aircraft |
|---|---|---|
| Light | Turbulence that momentarily causes slight, erratic changes in altitude and/or attitude (pitch, roll, yaw). Report as Light Turbulence; or Turbulence that causes slight, rapid and somewhat rhythmic bumpiness without appreciable changes in altitude or attitude. Report as Light Chop. | Occupants may feel a slight strain against seat belts or shoulder straps. Unsecured objects may be displaced slightly. Food service may be conducted and little or no difficulty is encountered in walking. |
| Moderate | Turbulence that is similar to Light Turbulence but of greater intensity. Changes in altitude and/or attitude occur but the aircraft remains in positive control at all times. It usually causes variations in indicated airspeed. Report as Moderate Turbulence; or Turbulence that is similar to Light Chop but of greater intensity. It causes rapid bumps or jolts without appreciable changes in aircraft altitude or attitude. Report as Moderate Chop. | Occupants feel definite strains against seat belts or shoulder straps. Unsecured objects are dislodged. Food service and walking are difficult. |
| Severe | Turbulence that causes large, abrupt changes in altitude and/or attitude. It usually causes large variations in indicated airspeed. Aircraft may be momentarily out of control. Report as Severe Turbulence. | Occupants are forced violently against seat belts or shoulder straps. Unsecured objects are tossed about. Food service and walking are impossible. |
| Extreme | Turbulence in which the aircraft is violently tossed about and is practically impossible to control. It may cause structural damage. Report as Extreme Turbulence. | |

(from Aeronautical Information Manual)

TACTILE INPUT CONTOL DATA MODIFYING SYSTEM, DEVICE, AND METHOD

BACKGROUND

A cursor's movement presented by a display unit may be the result of a user's tactile interaction with a tactile input unit such as a trackball of a cursor control device (CCD) and/or touchscreen interface of a display unit. Under normal circumstance, the user's interaction with the trackball or touchscreen may be considered smooth. The expected result of this smooth interaction may be the viewing by the user of smooth movement of the cursor and/or smooth movement of an image being moved through touchscreen gesturing techniques.

When a trackball is moved with the user's interaction or a finger is moved across a touchscreen, control data may be generated responsive to this interaction. This control data may be presented to a display unit which, in turn, generates a movement of the cursor and/or an image being presented on a touchscreen. Control data representative of a user's smooth interaction may results with a smooth moving cursor or image being viewed.

There may be one or more factors which could interfere with the smooth interaction and/or smooth movement resulting is a jumpy or intermittent movement of the cursor or a "stuck" image displayed on a touchscreen that normally moves in response to gesturing. These factors could include turbulence, pilot fatigue, equipment deterioration, palm force, and/or pilot position.

SUMMARY

Embodiments of the inventive concepts disclosed herein are directed to a tactile control device and method for generating a modifier through the use of fuzzy logic. The inventive concepts disclosed herein could modify the control data generated in response to a user's tactile interaction with a tactile control device in the presence of one or more interfering factors.

In one aspect, embodiments of the inventive concepts disclosed herein are directed to a system for modifying control data of a tactile input device. The system may include a source of input data representative of one or more measurements corresponding to one or more interfering factors, a source of control data representative of a command generated in response to the user's tactile interaction, and a processing unit (PU).

In a further aspect, embodiments of the inventive concepts disclosed herein are directed to a device for modifying control data of a tactile input device. The device could include the PU configured to perform the method in the paragraph that follows.

In a further aspect, embodiments of the inventive concepts disclosed herein are directed to a method for modifying control data of a tactile input device. When properly configured, the PU may receive input data representative of at least one measurement corresponding to a measurement(s) of an interfering factor, determine a plurality of values based upon the measurement(s) and a plurality of first functions, determine a control data modifier based upon the plurality of values, and generate data representative of the modifier, where the modifier may be applied to the control data.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 2 presents a table of turbulence classifications developed by the United States Federal Aviation Administration.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details, or in combination with other components, etc. In other instances, well-known implementations or operations are not shown or described in detail to avoid obscuring aspects of various embodiments of the inventive concepts disclosed herein.

Figure 1A:
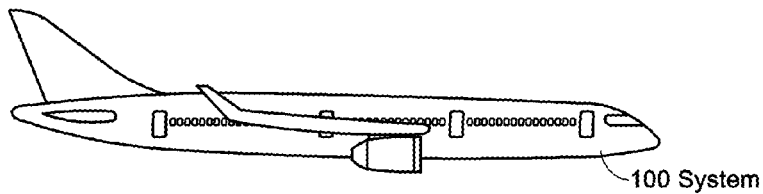
FIG. 1A depicts an aircraft configured with a control data modification system according to the inventive concepts disclosed herein.
Figure 1B:
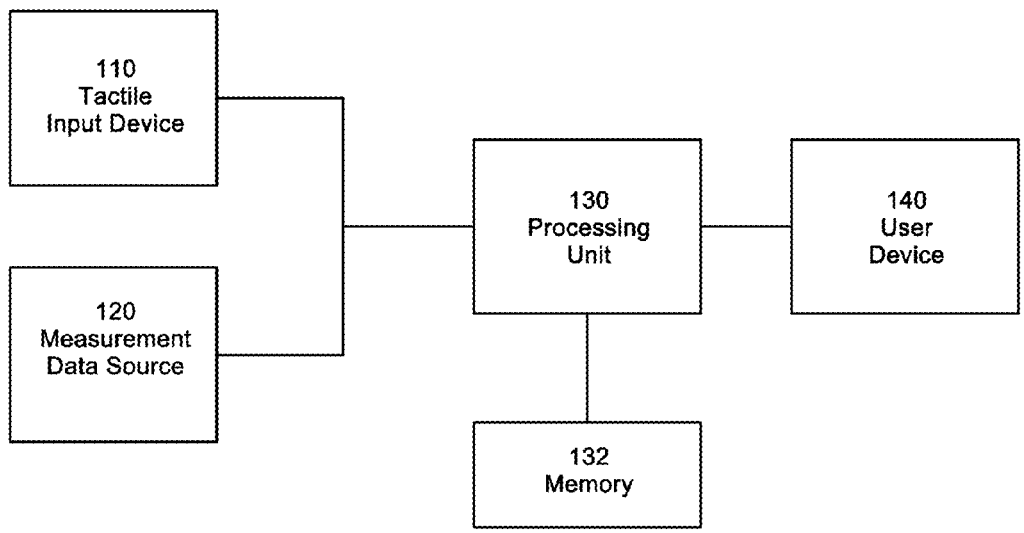
FIG. 1B depicts a functional block diagram of the control data modification system of FIG. 1A.
Figure 1C:
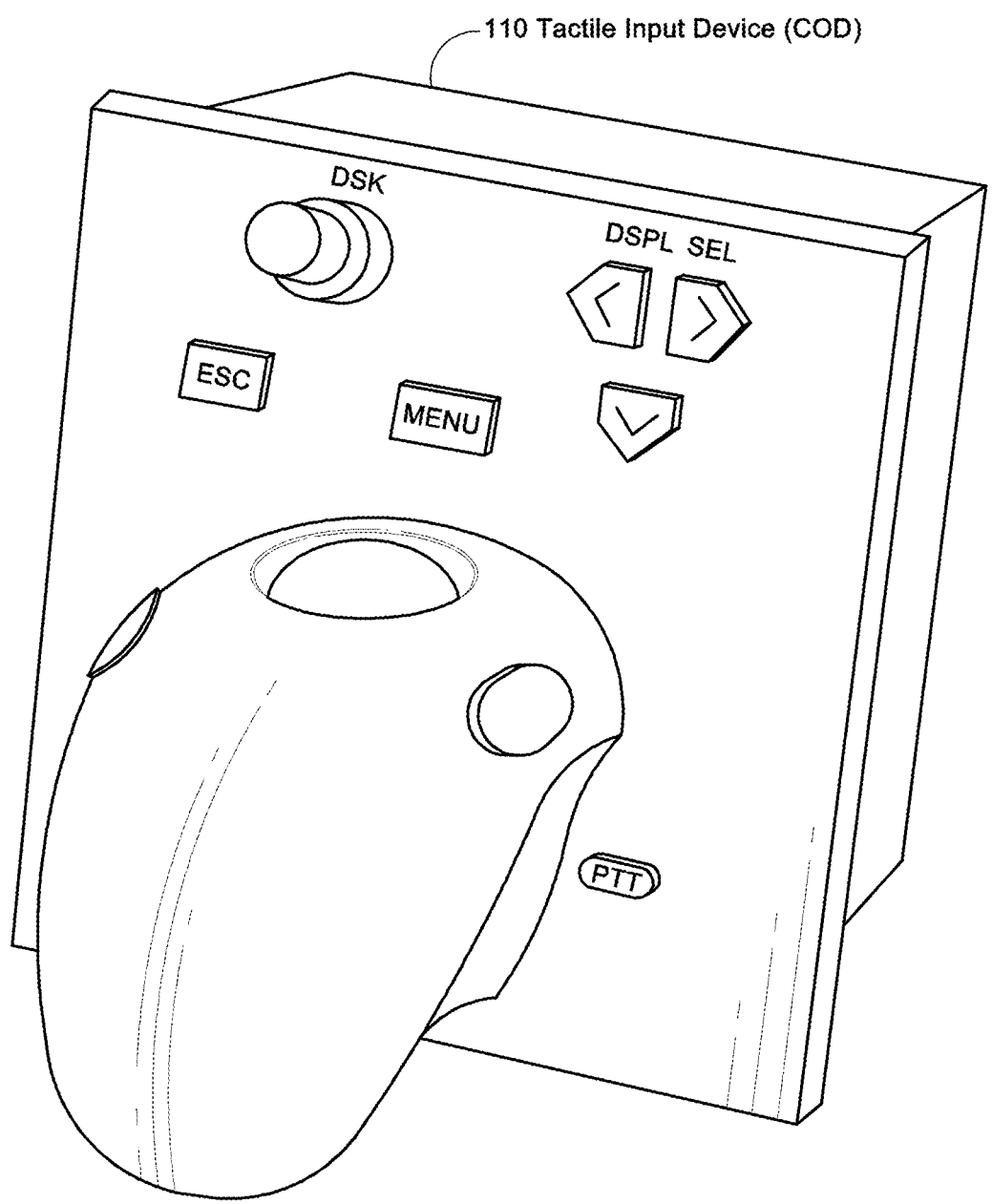
FIG. 1C depicts an exemplary embodiment of a tactile control device.

Referring now to FIGS. 1A-1C, an embodiment of a control data modification system 100 suitable for implementation of the techniques described herein includes a tactile input device 110, a measurement data source an interfering factor (MDS) 120, a processing unit (PU) 130, and a user device 140.

The tactile input device 110 could include any device set up to receive a user's tactile interaction. The tactile input device 110 could include a cursor control device (CCD) as shown in FIG. 1C. In some embodiments, the tactile input device 100 could include a touchscreen of a display device.

The MDS 120 includes any source of data representative of one or more measurements that could correspond to factors related to an interference of a user's interaction with the tactile input device 110 and/or an expected response to the user's tactile interaction. For example, a user may experience interference when interacting with the CCD, and/or an expected smooth response of a cursor resulting from a user's interaction with the CCD.

In some embodiments, a navigation system could be the MDS 120 for data representative of attitude measurement(s) and/or accelerometer measurements corresponding to a factor related to turbulence. In some embodiments, the navigation system could be the MDS 120 for data representative of time of flight measurements corresponding to a factor related to fatigue. In some embodiments, aircraft and/or component maintenance records could be the MDS 120 for data representative of an elapsed time corresponding to a factor related to equipment deterioration, where the elapsed time could be the time since the component was installed in the aircraft or repaired in a shop.

In some embodiments, the tactile unit device 110 configured with a force sensor could be the MDS 120 for data representative of palm force corresponding to a factor related to the natural force exerted by the palm of a hand during a user's interaction with the CCD. In some embodiments, a seat configured with a position sensor could be the MDS 120 for data representative of a position of the pilot's seat measurement corresponding to a factor related to pilot position.

The PU 130 could include any electronic data processing unit which executes software or computer instruction code that could be stored, permanently or temporarily, in a digital memory storage device or a non-transitory computer-readable media (generally, memory 132) including, but not limited to, random access memory (RAM), read-only memory (ROM), compact disc (CD), hard disk drive, diskette, solid-state memory, Personal Computer Memory Card International Association card (PCMCIA card), secure digital cards, and compact flash cards. The PU 130 may be driven by the execution of software or computer instruction code containing algorithms developed for the specific functions embodied herein. The PU 130 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the PU 130 could also include more than one electronic data processing unit. In some embodiments, the PU 130 could be a processor(s) used by or in conjunction with any other system of the aircraft including, but not limited to, the tactile input device 110, the MDS 120, and/or the user device 140.

In some embodiments, the terms "programmed" and "configured" are synonymous. In some embodiments, the term "data" could include any analog or digital signal, either discrete or continuous, which could contain information or be indicative of information. The PU 130 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a bus, through a wireless network, or as a signal received and/or transmitted by the PU 130 via a physical or a virtual computer port. The PU 130 may be programmed or configured to execute the method discussed in detail below. The PU 130 may be programmed or configured to provide input and/or output data to various systems and/or units including, but not limited to, the tactile input device 110, the MDS 120, and/or the user device 140.

The user device 140 could include any unit responsive to a user's interaction with the tactile input device 110. In some embodiments, the user device 140 could be a display unit on which the movement of a cursor is viewed as being responsive to a user's interaction with the CCD, where control data representative of a steering command resulting from a user's interaction could be generated and provided to the display unit.

Some advantages and benefits of the inventive concepts disclosed herein are shown in FIGS. 2 through 6C, illustrating how factor(s) related to an interference of a user's interaction with the tactile input device 110 could be attenuated through the application of fuzzy logic. Turbulence is an example of one possible factor.

Referring to FIG. 2, the United States Federal Aviation Administration (FAA) has published a manual entitled "Aeronautical Information Manual," within which a turbulence reporting criteria table has been developed for pilots to use when reporting turbulence to the FAA. As shown, the FAA has classified turbulence as functions of intensities: LIGHT, MODERATE, SEVERE, and EXTREME. LIGHT intensity may be defined as LIGHT TURBULENCE or LIGHT CHOP, and MODERATE intensity as MODERATE TURBULENCE or MODERATE CHOP. These intensities may be applied to fuzzy logic.

Figure 3A:
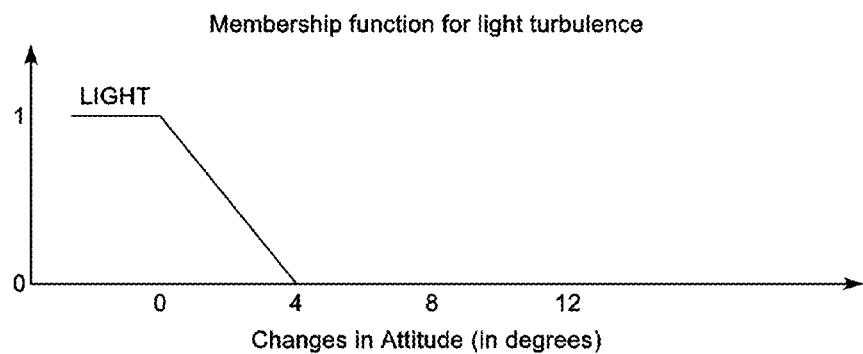
FIG. 3A depicts an exemplary embodiment of a membership function for light turbulence according to the inventive concepts disclosed herein.
Figure 3B:
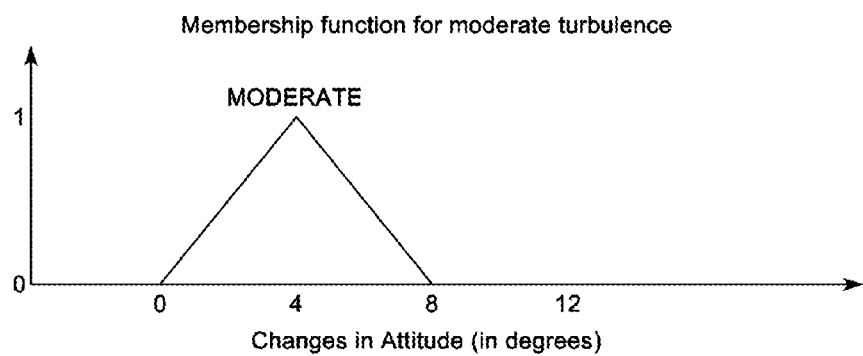
FIG. 3B depicts an exemplary embodiment of a membership function for moderate turbulence according to the inventive concepts disclosed herein.
Figure 3C:
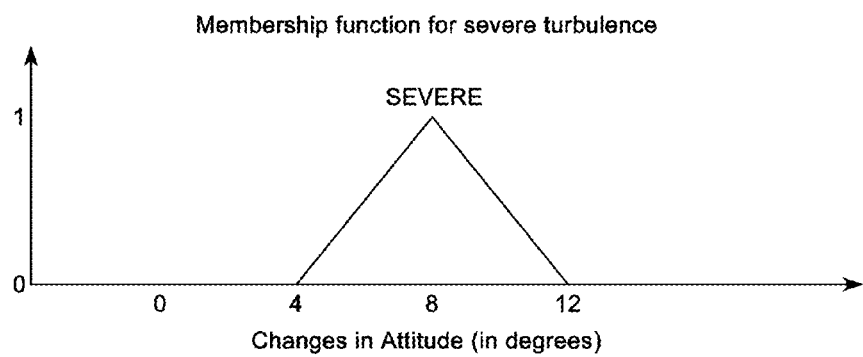
FIG. 3C depicts an exemplary embodiment of a membership function for severe turbulence according to the inventive concepts disclosed herein.
Figure 3D:
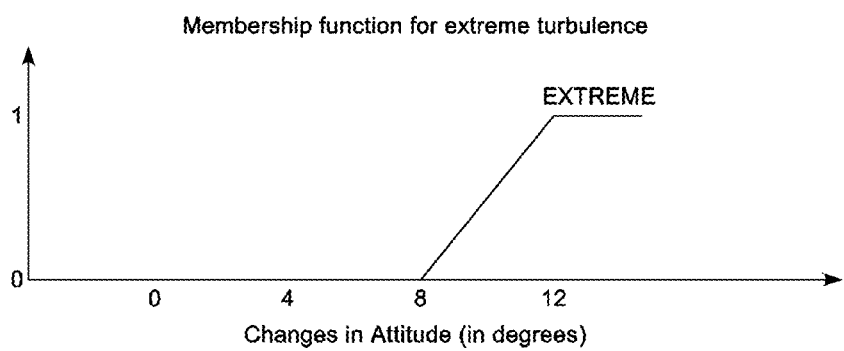
FIG. 3D depicts an exemplary embodiment of a membership function for extreme turbulence according to the inventive concepts disclosed herein.
Figure 3E:
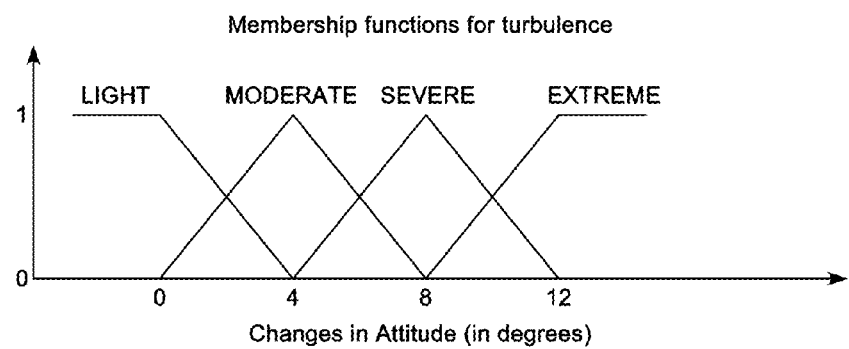
FIG. 3E depicts an exemplary embodiment of the membership functions of FIGS. 3A through 3D mapped together on one scale according to the inventive concepts disclosed herein.

Referring now to FIGS. 3A through 3D, fuzzy logic employs membership functions, and a membership function for each intensity of turbulence may be developed or created. As shown in the table of FIG. 2, the intensities LIGHT TURBULENCE, MODERATE TURBULENCE, SEVERE, and EXTREME have been based upon changes in altitude and/or attitude (pitch, row, yaw). Measurements of altitude and/or attitude could have several separate membership functions, where each membership function could be applied to a range within these measurements. As shown in FIG. 2A though 2E, a horizontal scale showing measurements of changes of one attitude of the roll, pitch, or yaw attitudes has been established. In FIGS. 2A through 2D, each membership function has been mapped to a specific range of the measurements: LIGHT TURBULENCE membership function is mapped to a range of measurements between zero and four degrees, MODERATE TURBULENCE to between zero and eight degrees, SEVERE to between four and twelve degrees, and EXTREME is mapped to a range of measurements greater than eight degrees. In FIG. 3E, the four membership functions are mapped together on one scale.

Figure 4A:
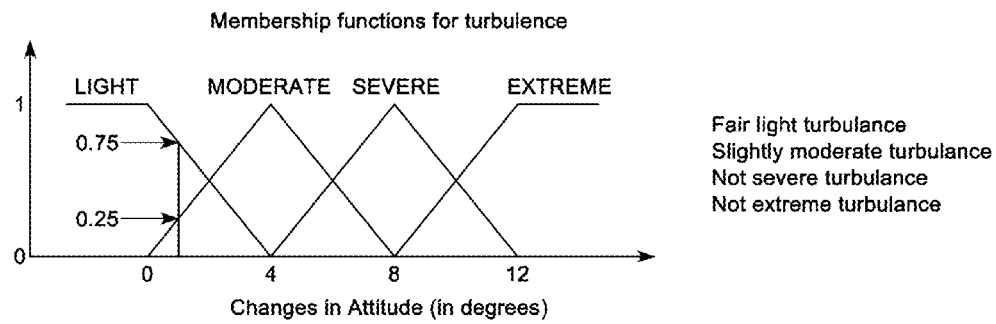
FIG. 4A depicts an exemplary embodiment of truth values for one degree of measurement according to the inventive concepts disclosed herein.
Figure 4B:
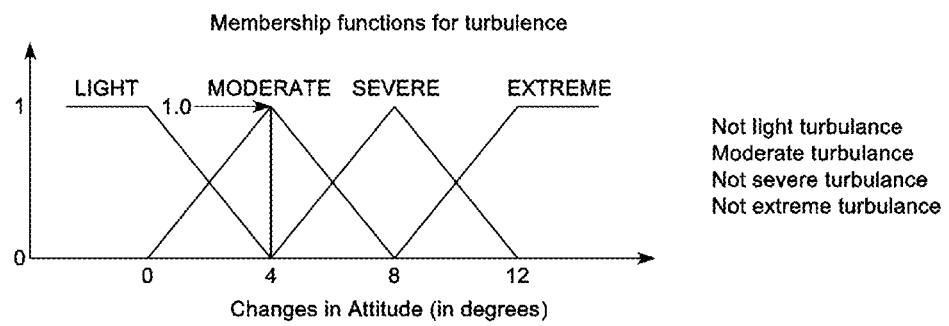
FIG. 4B depicts an exemplary embodiment of truth values for four degrees of measurement according to the inventive concepts disclosed herein.
Figure 4C:
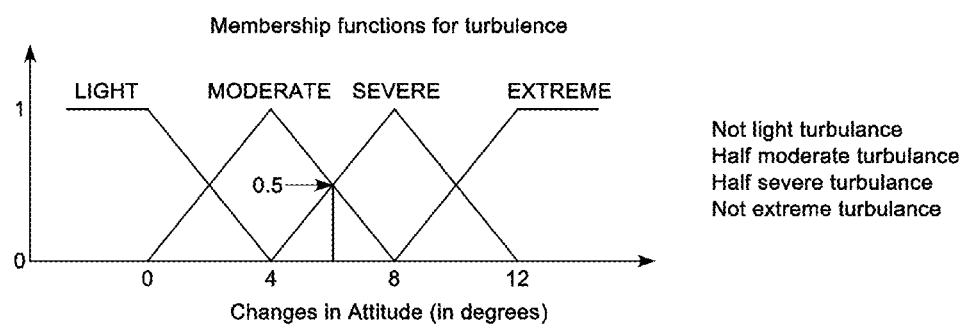
FIG. 4C depicts an exemplary embodiment of truth values for six degrees of measurement according to the inventive concepts disclosed herein.

Referring now to FIGS. 4A through 4C, points on the scale have four truth values and interpretations, where each truth value has a range between zero and one. As shown in FIG. 4A, the four membership functions (from left to right) correspond to truth values of 0.75, 0.25, 0, and 0 for one degree of measurement, where this measurement may be interpreted as fairly light turbulence, slightly moderate turbulence, not severe, and not extreme. Similar, as shown in FIG. 4B, the four membership functions correspond to truth values of 0, 1, 0, and 0 for four degrees of measurement interpreted as not light turbulence, moderate turbulence, not severe, and not extreme. Likewise, as shown in FIG. 4C, the four membership functions correspond to truth values of 0, 0.5, 0.5, and 0 for six degrees of measurement interpreted as not light turbulence, half moderate turbulence, half severe, and not extreme.

The LIGHT TURBULENCE, MODERATE TURBULENCE, SEVERE, and EXTREME membership functions may serve as input membership functions. Similarly, membership functions may serve as output membership functions.

Figure 5:
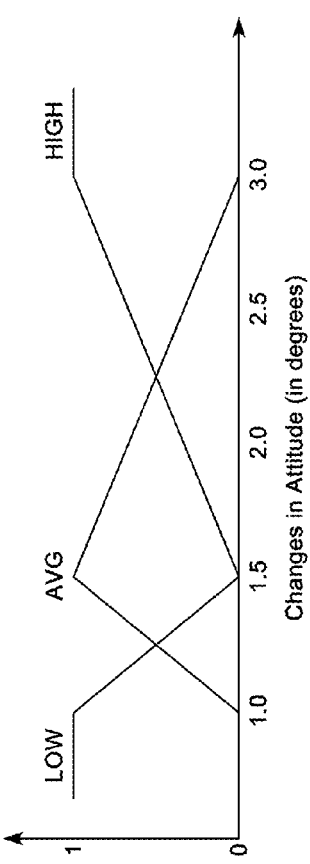
FIG. 5 depicts an exemplary embodiment of the second membership functions mapped together on one scale according to the inventive concepts disclosed herein.

Referring now to FIG. 5, LOW, AVG, and HIGH membership functions (output) mapped to a range of multipliers are illustrated with the LIGHT TURBULENCE, MODERATE TURBULENCE, SEVERE, and EXTREME membership functions. In some embodiments, at least one turbulence membership function may correspond to at least one multiplier membership function. For a truth value coinciding with LIGHT TURBULENCE membership function, the corresponding multiplier membership function could be LOW. For a truth value coinciding with MODERATE TURBULENCE membership function, the corresponding membership function could be AVG. For a truth value coinciding with the SEVERE or EXTREME membership functions, the corresponding multiplier function could be HIGH.

Figure 6B:
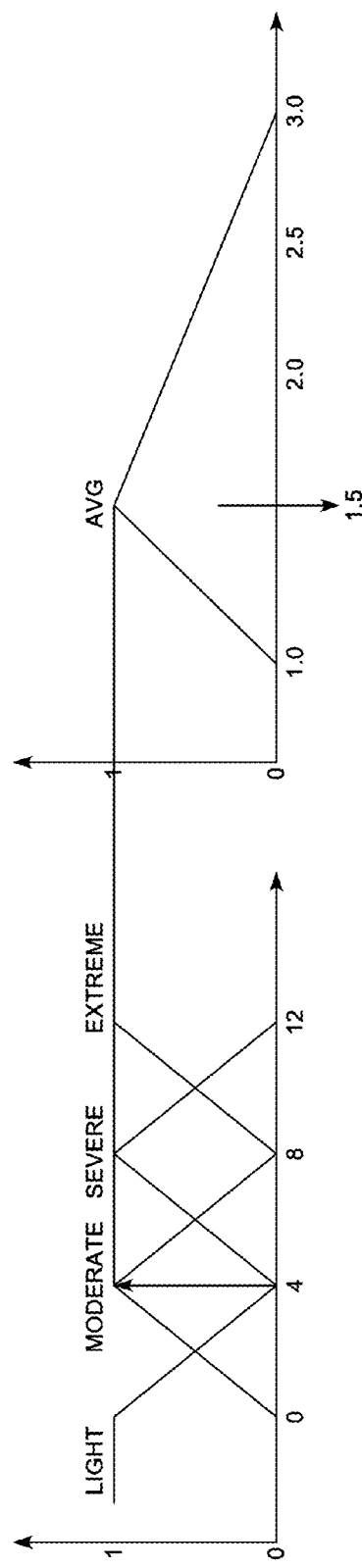
FIG. 6B depicts an exemplary embodiment of determining a second modifier with a second membership function according to the inventive concepts disclosed herein.
Figure 6A:
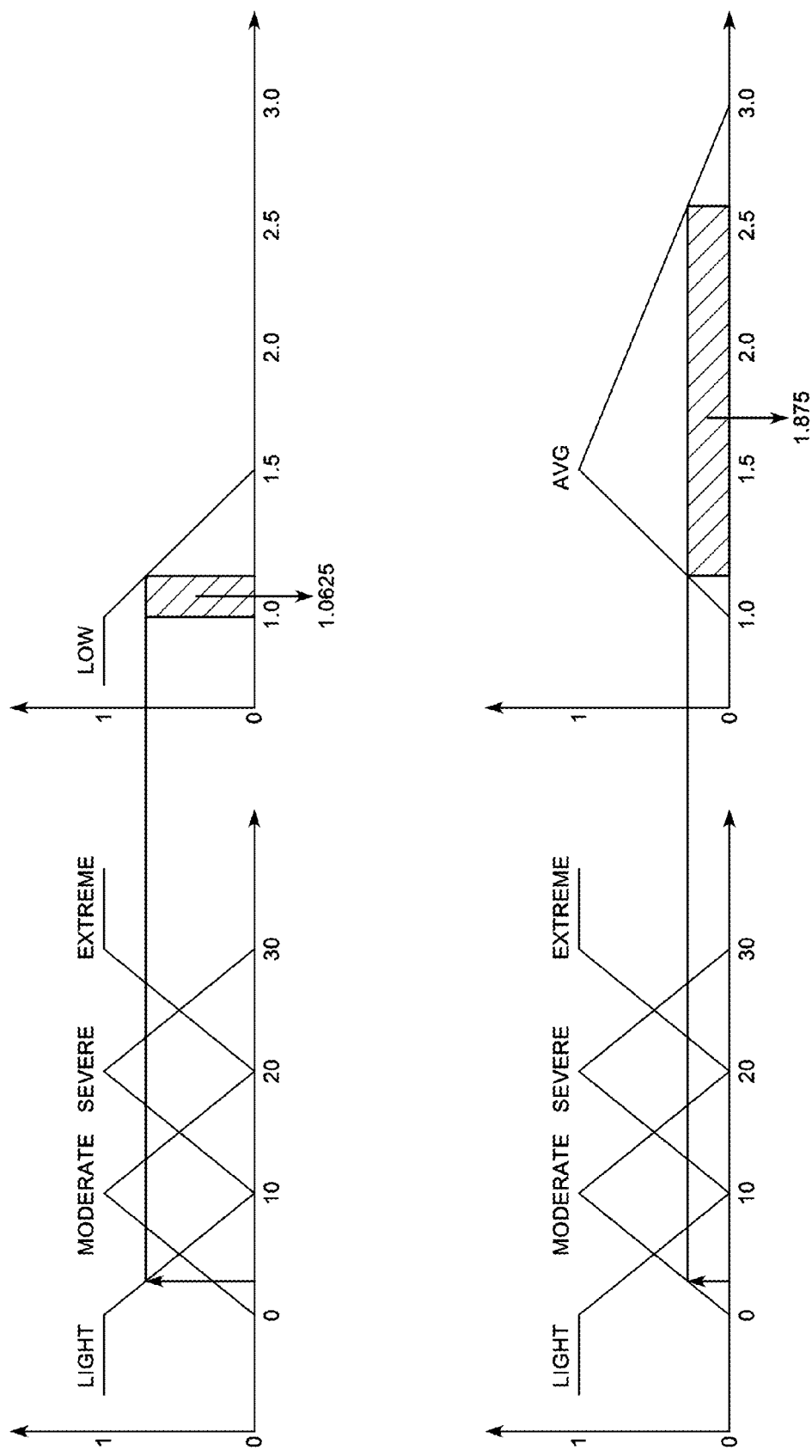
FIG. 6A depicts an exemplary embodiment of determining a modifier with a second membership function according to the inventive concepts disclosed herein.
Figure 6C:
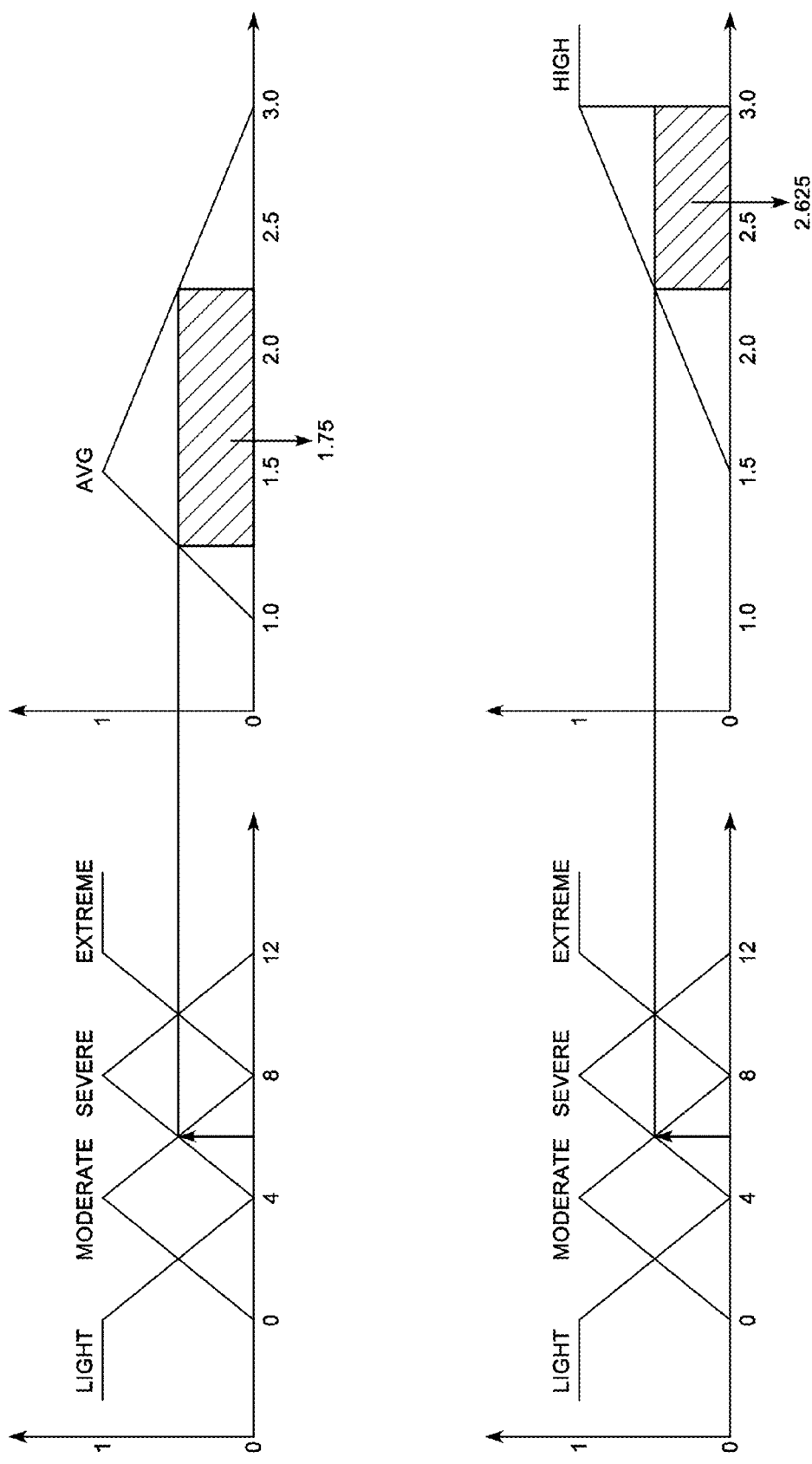
FIG. 6C depicts an exemplary embodiment of determining a third modifier with a second membership function according to the inventive concepts disclosed herein.

Referring now to FIGS. 6A through 6C, the truth values found in FIGS. 4A through 4C, respectively, may be used to determine multipliers corresponding to the degrees of measurement. As shown in FIG. 6A, a first multiplier may be determined by finding a centroid of a shape under the LOW multiplier membership function form a point coinciding with the truth value 0.75. Similarly, a second multiplier may be determined by finding a centroid of a shape under the AVG multiplier membership function form a point coinciding with the truth value 0.25. As shown, the first multiplier has been found to be 1.0625, and the second multiplier 1.875. If the average of the first and second multipliers is assumed to be the multiplier corresponding to a specific degree of measurement, then the multiplier corresponding to one degree of measurement is 1.46875.

The multiplier may now be used to change a setting of control data generated in response to a user's tactile input and provided to the user device 140. For example, if the control data is representative of a user's input corresponding to one revolution of a trackball, the control data may be modified so that the user's input is indicative of a trackball revolving 0.68085 of a revolution (i.e., user's input divided by the modifier).

As shown in FIG. 6B, only one multiplier function is needed because four degrees of measurement resulted with the MODERATE TURBULENCE membership function being viable. As observed, the multiplier corresponding to four degrees of measurement has been found to be 1.5. As shown in FIG. 6C, the first multiplier has been found to be 1.75, and the second multiplier 2.625. Assuming the average of the first and second multipliers to be the multiplier corresponding to a specific degree of measurement, then the multiplier for six degrees of measurement is 2.1875.

Figure 7:
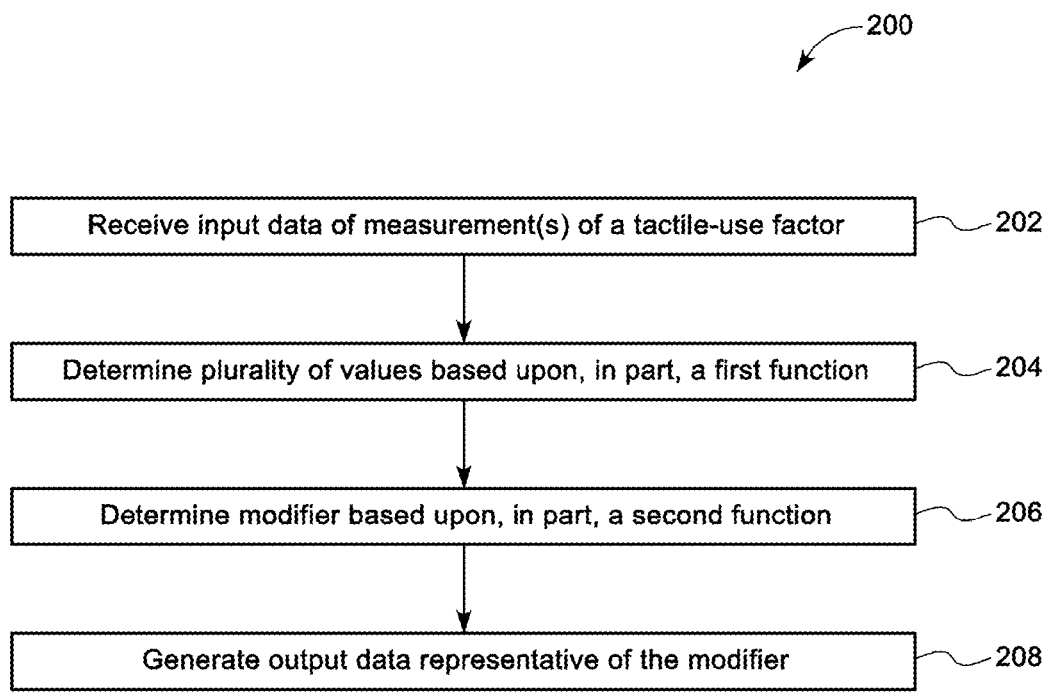
FIG. 7 depicts an exemplary embodiment of a flowchart disclosing a method for modifying control data of the tactile input device according to the inventive concepts disclosed herein.

FIG. 7 depicts flowchart 200 disclosing an example of a method for modifying control data of a tactile input device, where the PU 130 may be programmed or configured with instructions corresponding to the modules embodied in flowchart 200. In some embodiments, the PU 130 may be a processor or a combination of processors found in the tactile input device 110, the user device 140, or any other system suitable for performing the task. Also, the PU 130 may be a processor of a module such as, but not limited to, a printed circuit card having one or more input interfaces to facilitate the two-way data communications of the PU 130, i.e., the receiving and providing of data. As necessary for the accomplishment of the following modules embodied in flowchart 200, the acquiring of data is synonymous and/or interchangeable with the receiving and/or retrieving of data, and the providing of data is synonymous and/or interchangeable with the making available or supplying of data.

The method of flowchart 200 begins with module 202 with the PU 130 receiving input data representative of one or more measurements that could correspond to factors related to the user's input. In some embodiments, turbulence could be factor that could affect a user's interaction with, for example, a CCD and/or a touchscreen device. A manufacturer and/or end-user could employ, for example, data representative of attitude measurement(s) and/or measurements obtained from attitude sensors for sensing one or more attitudes about one or more of the three aircraft axes. For turbulence intensities classified as light chop or moderate chop, a manufacturer and/or end-user could employ, for example, data representative of acceleration measurement(s) and/or measurements obtained from accelerometers for sensing rapids aircraft displacements along its vertical axis.

In some embodiments, pilot fatigue could be factor that could affect a user's interaction with, for example, the CCD. In some embodiments, the user's interaction could include the gesturing performed on a touchscreen device, where the gesturing could be made on an image of a control panel and/or control buttons or switches. A manufacturer and/or end-user could employ, for example, measurements of time of flight and define a plurality of exemplary categories such as SHORT RANGE, MID RANGE, and LONG RANGE membership functions, where each of these could be mapped to a range of time of flight measurements.

In some embodiments, equipment deterioration of a mechanical component (such as a trackball of CCD or dirty screen of a touchscreen device) could be a factor that could affect a user's interaction and/or the response of the controlled object (such as a jumpy or intermittent movement of a cursor with the steady movement of the trackball). A manufacturer and/or end-user could employ, for example, component maintenance records for measurements such as a lapse of time from when the component was installed in an aircraft or repaired in a shop. Then, a plurality of exemplary categories such as SHORT TERM, MID TERM, and LONG TERM membership functions could be defined, where each of these could be mapped to a range of time of maintenance activities.

In some embodiments, a natural force exerted by the palm of a hand could be factor that could affect a user's interaction with, for example, the CCD and/or a touchscreen. A manufacturer and/or end-user could employ, for example, measurements of palm force and define a plurality of exemplary categories such as LOW, AVERAGE, and HIGH membership functions, where each of these could be mapped to a range of palm force measurements.

In some embodiments, a pilot's position with respect to the CCD could be a factor that could affect a user's interaction. A manufacturer and/or end-user could employ, for example, a seat position sensor(s) from which data representative of pilot seat position measurement could be obtained and define a plurality of exemplary categories such as SHORT, AVERAGE, and TALL membership functions, where each of these could be mapped to a range of position measurements.

The flowchart 200 continues with module 204 with the PU 130 determining one or more values as a function of the input data representative of one or more measurements and a plurality of first functions. In some embodiments, each value(s) could be a truth value of a fuzzy logic membership function. In some embodiments, each first function of the plurality of first functions could be a fuzzy logic membership function.

The flowchart 200 continues with module 206 with the PU 130 determining a modifier based upon the value(s) and a plurality of second functions. In some embodiments, each second function could a fuzzy logic membership function. In some embodiments, the modifier could be determined from a plurality of modifiers, where each modifier of the plurality could be determined by applying one truth value to one membership function.

The flowchart 200 continues with module 208 with the PU 130 generating output data representative of the modifier. In some embodiments, the output data could modify control data or data corresponding to the control data (e.g., cursor settings) to form modified data. In some embodiments, the control data could be representative of a command generated in response to the user's tactile interaction. In some embodiments, the modified control data could be data representative of the modifier being applied to the command. Then, the method of flowchart 200 ends.

It should be noted that the steps of the method described above may be embodied in computer-readable media stored in a non-transitory computer-readable medium as computer instruction code. The method may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Further, steps not expressly disclosed or inherently present herein may be interspersed with or added to the steps described herein, or may be substituted for one or more of the steps described herein as will be appreciated by a person of ordinary skill in the art having the benefit of the instant disclosure.

As used herein, the term "embodiment" means an embodiment that serves to illustrate by way of example but not limitation.

It will be appreciated to those skilled in the art that the preceding examples and embodiments are exemplary and not limiting to the scope of the inventive concepts disclosed herein. It is intended that all modifications, permutations, enhancements, equivalents, and improvements thereto that are apparent to those skilled in the art upon a reading of the specification and a study of the drawings are included within the true spirit and scope of the inventive concepts disclosed herein. It is therefore intended that the following appended claims include all such modifications, permutations, enhancements, equivalents, and improvements falling within the true spirit and scope of the inventive concepts disclosed herein.

The invention claimed is:

1. A system for modifying control data of a tactile input device, comprising:
a source of input data representative of at least one measurement corresponding to a factor interfering with at least one of a user's tactile interaction with an input device and an expected response to the user's tactile interaction;
a source of control data representative of a command generated in response to the user's tactile interaction; and
a processing unit including at least one processor coupled to a non-transitory processor-readable medium storing processor-executable code and configured to:
receive the input data and the control data;
determine a plurality of values based upon the at least one measurement and a plurality of first functions;
determine a modifier based upon the plurality of the values and a plurality of second functions; and
generate output data representative of the modifier, such that
the output data modifies at least one of the control data and data corresponding to the control data to form modified data, where
the modified data is representative of the modifier being applied to the control data.

2. The tactile input device of claim 1, wherein the input device is a cursor control device.

3. The tactile input device of claim 1, wherein
the modifier is a first modifier, and
the determination of the first modifier is based upon a plurality of second modifiers.

4. The tactile input device of claim 3, wherein each second modifier of the plurality of second modifiers is based upon one value of the plurality of values and one second function of the plurality of second functions.

5. The tactile input device of claim 1, wherein the plurality of first functions correspond to at least one of turbulence, pilot fatigue, equipment deterioration, palm force, and pilot position.

6. The tactile input device of claim 1, wherein
each value of the plurality of values is one truth value of a membership function of fuzzy logic, and
each first function of the plurality of first functions is a membership function of the fuzzy logic.

7. The tactile input device of claim 1, wherein each second function of the plurality of second functions is a membership function of fuzzy logic.

8. A processing device for modifying control data of a tactile input device, comprising:
a processing unit including at least one processor coupled to a non-transitory processor-readable medium storing processor-executable code and configured to:
receive input data representative of at least one measurement corresponding to a factor interfering with at least one of a user's tactile interaction with an input device and an expected response to the user's tactile interaction;
determine a plurality of values based upon the at least one measurement and a plurality of first functions;
determine a modifier based upon the plurality of the values and a plurality of second functions; and generate output data representative of the modifier, such that
  the output data modifies at least one of control data and data corresponding to the control data to form modified data, where
    the control data is representative of a command generated in response to the user's tactile interaction, and
    the modified data is representative of the modifier being applied to the control data.

9. The processing device of claim 8, wherein the input device is a cursor control device.

10. The processing device of claim 8, wherein
the modifier is a first modifier, and
the determination of the first modifier is based upon a plurality of second modifiers.

11. The processing device of claim 10, wherein each second modifier of the plurality of second modifiers is based upon one value of the plurality of values and one second function of the plurality of second functions.

12. The processing device of claim 8, wherein
each value of the plurality of values is one truth value of a membership function of fuzzy logic, and
each first function of the plurality of first functions is a membership function of the fuzzy logic.

13. The processing device of claim 8, wherein each second function of the plurality of second functions is a membership function of fuzzy logic.

14. The processing device of claim 8, wherein the plurality of first functions correspond to at least one of turbulence, pilot fatigue, equipment deterioration, palm force, and pilot position.

15. A method for modifying control data of a tactile input device, comprising:
  receiving, by a processing unit including at least one processor coupled to a non-transitory processor-readable medium storing processor-executable code, input data representative of at least one measurement corresponding to a factor interfering with at least one of a user's tactile interaction with an input device and an expected response to the user's tactile interaction;
  determining a plurality of values based upon the at least one measurement and a plurality of first functions;
  determining a modifier based upon the plurality of the values and a plurality of second functions; and
  generating output data representative of the modifier, such that
    the output data modifies at least one of control data and data corresponding to the control data to form modified data, where
      the control data is representative of a command generated in response to the user's tactile interaction, and
      the modified data is representative of the modifier being applied to the control data.

16. The method of claim 15, wherein
the modifier is a first modifier, and
the determination of the first modifier is based upon a plurality of second modifiers.

17. The method of claim 16, wherein each second modifier of the plurality of second modifiers is based upon one value of the plurality of values and one second function of the plurality of second functions.

18. The method of claim 15, wherein the plurality of first functions correspond to at least one of turbulence, pilot fatigue, equipment deterioration, palm force, and pilot position.

19. The method of claim 15, wherein
each value of the plurality of values is one truth value of a membership function of fuzzy logic, and
each first function of the plurality of first functions is a membership function of the fuzzy logic.

20. The method of claim 15, wherein each second function of the plurality of second functions is a membership function of fuzzy logic.

* * * * *